(12) United States Patent
Feuerstack et al.

(10) Patent No.: US 9,281,700 B2
(45) Date of Patent: Mar. 8, 2016

(54) POWER SUPPLY SYSTEM AND METHOD FOR CHARGING AT LEAST ONE ENERGY STORAGE CELL SERVING AS AN ENERGY STORE FOR A DC LINK IN A POWER SUPPLY SYSTEM

(75) Inventors: Peter Feuerstack, Ludwigsburg (DE); Erik Weissenborn, Stuttgart (DE); Martin Kessler, Schwaebisch Gmuend (DE)

(73) Assignee: ROBERT BOSCH GMBH, Stuttgart (DE)

( * ) Notice: Subject to any disclaimer, the term of this patent is extended or adjusted under 35 U.S.C. 154(b) by 531 days.

(21) Appl. No.: 13/824,749

(22) PCT Filed: Aug. 25, 2011

(86) PCT No.: PCT/EP2011/064642
§ 371 (c)(1),
(2), (4) Date: Jun. 10, 2013

(87) PCT Pub. No.: WO2012/038188
PCT Pub. Date: Mar. 29, 2012

(65) Prior Publication Data
US 2013/0241472 A1 Sep. 19, 2013

(30) Foreign Application Priority Data
Sep. 20, 2010 (DE) .......................... 10 2010 041 040

(51) Int. Cl.
*H02J 7/14* (2006.01)
*H02J 7/00* (2006.01)
(Continued)

(52) U.S. Cl.
CPC ........... *H02J 7/0042* (2013.01); *B60L 11/1864* (2013.01); *H01M 10/441* (2013.01);
(Continued)

(58) Field of Classification Search
CPC .......................................................... H02J 7/00
USPC ........................................................ 320/104
See application file for complete search history.

(56) References Cited

U.S. PATENT DOCUMENTS

| 7,579,792 B2 * | 8/2009 | Nagashima | ............. B60L 11/12 318/105 |
|---|---|---|---|
| 8,058,830 B2 * | 11/2011 | John | ................... B60L 11/1868 318/107 |
| 2005/0231152 A1 | 10/2005 | Welchko et al. | |

FOREIGN PATENT DOCUMENTS

| CN | 101436831 | 5/2009 |
|---|---|---|
| DE | 10 2010 027 857 | 4/2010 |

(Continued)

OTHER PUBLICATIONS

International Search Report for PCT/EP2011/064642, dated Sep. 27, 2012.

*Primary Examiner* — Edward Tso
*Assistant Examiner* — Ahmed Omar
(74) *Attorney, Agent, or Firm* — Kenyon & Kenyon LLP

(57) ABSTRACT

A power supply system has an n-phase electric machine, where $n \geq 1$, and a controllable energy store serving to control and to supply electrical energy to the electric machine. The controllable energy store has n parallel power supply arms which each have at least two series-connected energy storage modules which each include at least one electrical energy storage cell with an associated controllable coupling unit, are connected on one side to a reference bus and are connected on the other side to one respective phase of the electric machine. In dependence on control signals, the coupling units either bridge the respectively associated energy storage cells or connect the respectively associated energy storage cells into the power supply arm.

10 Claims, 3 Drawing Sheets

(51) Int. Cl.
*B60L 11/18* (2006.01)
*H01M 10/44* (2006.01)
*H02J 7/34* (2006.01)
*H01M 16/00* (2006.01)
*H02M 7/483* (2007.01)

(52) U.S. Cl.
CPC ............. *H02J7/0024* (2013.01); *H02J 7/1423* (2013.01); *H02J 7/1492* (2013.01); *H02J 7/345* (2013.01); *H01M 16/00* (2013.01); *H02J 2007/0059* (2013.01); *H02J 2007/0067* (2013.01); *H02M 7/483* (2013.01); *Y02E 10/766* (2013.01); *Y02T 10/7005* (2013.01); *Y02T 10/7022* (2013.01); *Y02T 10/7055* (2013.01); *Y02T 10/7061* (2013.01); *Y02T 10/92* (2013.01)

(56) References Cited

FOREIGN PATENT DOCUMENTS

| | | |
|---|---|---|
| DE | 10 2009 000676 | 8/2010 |
| DE | 10 2010 027 861 | 10/2011 |
| JP | 5-95626 | 4/1993 |
| JP | 5-227607 | 9/1993 |
| JP | 10-14002 | 1/1998 |
| JP | 2007-252050 | 9/2007 |
| JP | 2010-178495 | 8/2010 |
| WO | WO 2006/112512 | 10/2006 |

* cited by examiner

POWER SUPPLY SYSTEM AND METHOD FOR CHARGING AT LEAST ONE ENERGY STORAGE CELL SERVING AS AN ENERGY STORE FOR A DC LINK IN A POWER SUPPLY SYSTEM

BACKGROUND OF THE INVENTION

1. Field of the Invention

The present invention relates to a power supply system and to a method for charging at least one energy storage cell serving as an energy store for a DC link in a power supply system.

2. Description of the Related Art

It is becoming apparent that, in future, electronic systems that combine new energy storage technologies with electric drive technology will be increasingly used both in stationary applications, such as, for example, wind power installations, and in vehicles, such as hybrid or electric vehicles. In conventional applications, an electric machine which, for example, is in the form of a rotating-field machine is controlled by way of a converter in the form of an inverter. Characteristic of such systems is a so-called DC link via which an energy store, usually a battery, is connected to the DC voltage side of the inverter. In order to be able to meet the requirements in terms of output and power for a particular application, a plurality of battery cells are connected in series. Since the current provided by such an energy store has to flow through all the battery cells limited current, battery cells are often additionally connected in parallel in order to increase the maximum current.

As well as providing a high total voltage, the series connection of a plurality of battery cells brings with it the problem that the entire energy store fails if a single battery cell fails, since battery current is then no longer able to flow. Such a failure of the energy store may lead to failure of the entire system. In the case of a vehicle, failure of the drive battery may lead to the vehicle being "stranded". In other applications, such as, for example, rotor blade adjustment in wind power installations, this may even give rise to hazardous situations under adverse general conditions, for example in a strong wind. For that reason, a constant objective is a high reliability of the energy store, "reliability" meaning the ability of a system to operate for a given time without any faults.

The German Patent Applications DE 10 2010 027857 and DE 10 2010 027861 describe batteries having a plurality of battery module strings that are directly connectable to an electric machine. The battery module strings have a plurality of battery modules connected in series, each battery module having at least one battery cell and an associated controllable coupling unit which allows the respective battery module string to be interrupted or allows the respectively associated at least one battery cell to be bridged or allows the respectively associated at least one battery cell to be connected into the respective battery module string, in dependence on control signals. By suitable actuation of the coupling units, for example with the aid of pulse width modulation, suitable phase signals may also be provided for controlling the electric machine, so that a separate pulse inverter may be dispensed with. The pulse inverter required for controlling the electric machine is therefore integrated, as it were, in the battery. For the purposes of disclosure, those two earlier Applications are also incorporated in their entirety in the present Application.

In contrast to conventional systems, in which an electric machine is controlled by way of an inverter and is supplied with electrical energy by an electrical energy store that is separate therefrom, a constant DC voltage is not available in the case of the batteries described in the German Applications DE 10 2010 027857 and DE 10 2010 027861, and therefore such batteries cannot be readily integrated into conventional power supply systems, such as, for example, on-board systems of an electric vehicle or a hybrid vehicle.

BRIEF SUMMARY OF THE INVENTION

The present invention provides a power supply system that has a controllable energy store serving to control and to supply electrical energy to an n-phase electric machine, where n≥1. The controllable energy store includes in this case n parallel power supply arms which each have at least two series-connected energy storage modules which each include at least one electrical energy storage cell with an associated controllable coupling unit. The power supply arms are connectable on one side to a reference potential—hereinafter referred to as a reference bus—and on the other side to one respective phase of the electric machine. In dependence on control signals, the coupling units either bridge the respectively associated energy storage cells or connect the respectively associated energy storage cells into the power supply arm. In at least one of the power supply arms, the energy storage cells of the energy storage module that is directly connected to the reference bus are directly connected to the reference bus. Those energy storage cells are used according to the present invention as energy stores for a DC link from which electrical consumers may be supplied with DC voltage.

The present invention also provides a method for charging at least one energy storage cell serving as an energy store for a DC link in a power supply system according to the present invention. In an operating phase of the electric machine in which current is flowing out of the electric machine into the controllable energy store, all of the coupling units associated with the energy storage cells serving as energy stores for a DC link are controlled in such a way that the associated energy storage cells are connected into the respective power supply arm.

During operation of the electric machine in motor mode, the controllable energy store provides at the output side an AC voltage for actuating the electric machine. In contrast to conventional systems, in which an electric machine is controlled via an inverter and is supplied with electrical energy by an electrical energy store that is separate therefrom, no DC voltage is available, however, for directly supplying power to electrical consumers, such as, for example, high-volt consumers in an onboard vehicle power supply system, or as an input quantity for a DC-DC converter.

The present invention is based on the basic idea of configuring, at least in one of the power supply arms, the energy storage module that is directly connected to the reference bus in such a way that the energy storage cells of that energy storage module are directly connected to the reference bus. In other words, the associated coupling unit is configured in such a way that, although it is able to bridge the energy storage cells or connect them into the power supply arm, it is not able to interrupt the electrical connection of the energy storage cells to the reference bus. Energy storage cells wired in that manner may then be used directly as energy stores for a DC link that is to be connected thereto. In that manner, the DC voltage required for supplying electrical consumers may be generated with extremely little expenditure on hardware.

The charging of the energy storage cells serving as energy stores for the DC link may take place during operation of the electric machine. For that purpose, the energy storage cells are simply connected into the respective power supply arm during an operating phase in which current is being fed back into the controllable energy store from the electric machine. The terminal voltage, which is thereby reduced for the electric machine, may be compensated for by suitable adaptation of the associated space phasor.

In order to increase the failure resistance and the total capacity of the energy store for the DC link, it is provided in accordance with one embodiment of the present invention that, in all of the power supply arms, the energy storage cells of the energy storage modules that are directly connected to the reference bus are directly connected to the reference bus and that all of those energy storage cells are used as parallel-connected energy stores for the DC link.

In accordance with one embodiment of the present invention, in that case the energy storage cells serving as energy stores for the DC link are each connected to the DC link via at least one diode. In that manner, the most powerful energy storage module, that is, the energy storage module whose energy storage cells currently have the greatest charge, is automatically loaded in each case.

To avoid current spikes, the energy storage cells serving as energy stores for the DC link may be connected to the DC link via at least one inductance.

A further embodiment of the present invention provides that a total voltage of the energy storage cells serving as energy stores for the DC link is less than or equal to 60 Volt, so that it is not necessary to provide additional safeguards, for example with regard to protection against accidental contact.

In accordance with one embodiment of the present invention, the DC link has a link capacitor which is electrically connected on one side to the reference bus and on the other side to a terminal connection of the energy storage cells serving as energy stores, which terminal connection is remote from the reference bus. By virtue of the contacting directly at the energy storage cells, any effect on the function of the energy storage cells as energy stores for the DC link by the coupling unit associated with the energy storage cells is reliably avoided without any additional expenditure.

As an alternative to this, the link capacitor may, however, be connected on one side to the reference bus and on the other side to an output of the energy storage module including the energy storage cells serving as energy stores, which output is remote from the reference bus.

With the aid of a first DC-DC converter which is connected downstream of the link capacitor, a first voltage level of the link capacitor may be adapted to a second voltage level of a further energy store. In that manner it is possible to implement a dual-voltage power supply system.

Alternatively or in addition, it is also possible to connect upstream of the link capacitor a second DC-DC converter which adapts a total voltage of the energy storage cells serving as energy stores for the DC link to a first voltage level of the link capacitor.

Further features and advantages of embodiments of the present invention will be apparent from the following description with reference to the accompanying drawings.

DETAILED DESCRIPTION OF THE INVENTION

Figure 1:
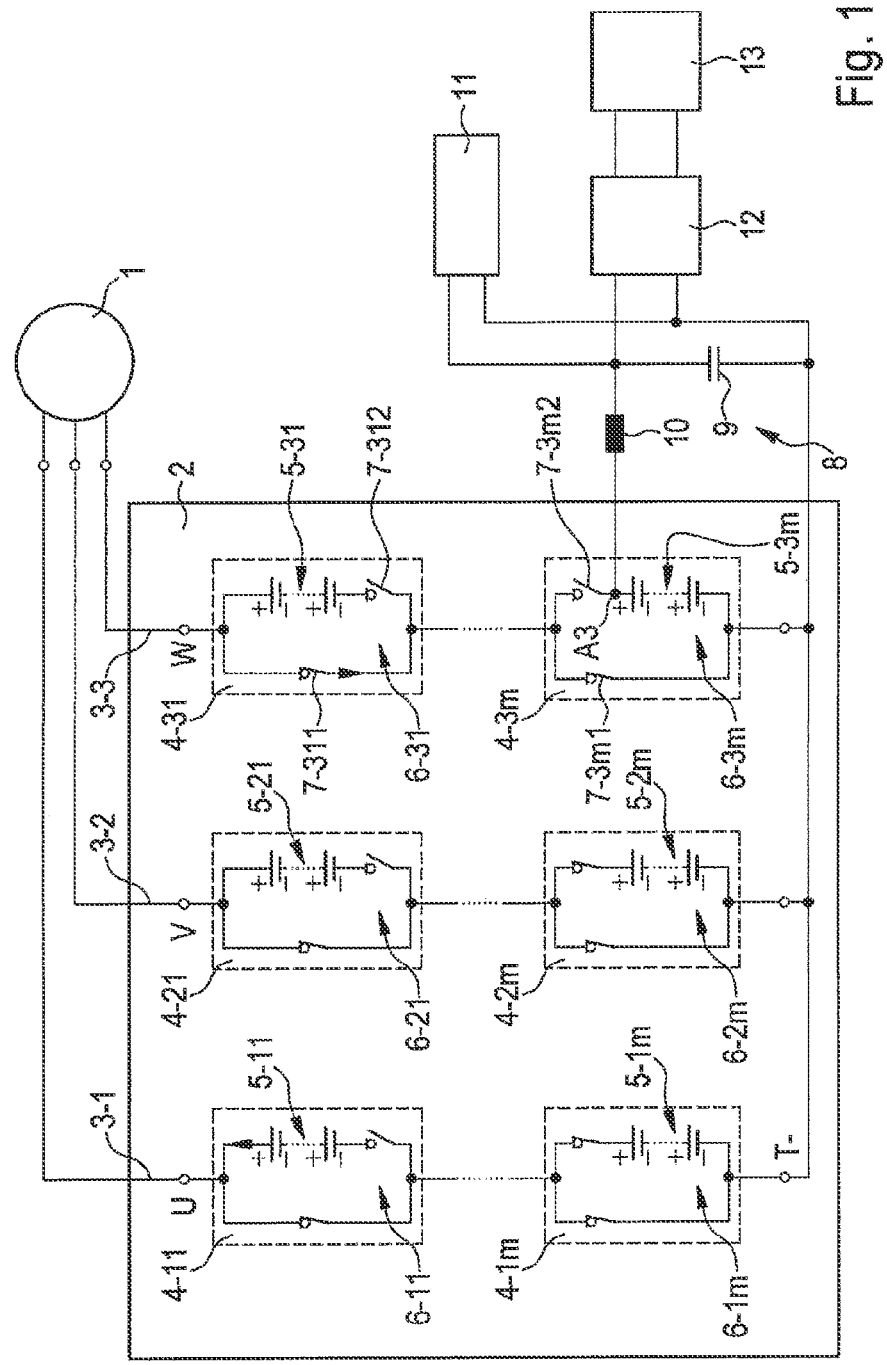
FIG. 1 is a schematic illustration of a first embodiment of a power supply system according to the invention.

FIG. 1 shows schematically an embodiment of a power supply system according to the invention. A controllable first energy store 2 is connected to a three-phase electric machine 1. Controllable first energy store 2 includes three power supply arms 3-1, 3-2 and 3-3 which are connected on one side to a reference potential T-(reference bus), which carries a low potential in the exemplary embodiment illustrated, and on the other side are each connected to respective individual phases U, V, W of electric machine 1. Each of power supply arms 3-1, 3-2 and 3-3 has m series-connected energy storage modules 4-11 through 4-1$m$, 4-21 through 4-2$m$ and 4-31 through 4-3$m$, respectively, where m≥2. Energy storage modules 4 each include in turn a plurality of series-connected electrical energy storage cells 5-11 through 5-1$m$, 5-21 through 5-2$m$ and 5-31 through 5-3$m$, respectively. Energy storage modules 4 furthermore each include a coupling unit 6-11 through 6-1$m$, 6-21 through 6-2$m$ and 6-31 through 6-3$m$, respectively, which is associated with energy storage cells 5-11 through 5-1$m$, 5-21 through 5-2$m$ and 5-31 through 5-3$m$, respectively, of respective energy storage module 4. In the embodiment variant illustrated, coupling units 6 are each formed by two controllable switching elements, which for clarity of the drawings are provided with reference characters 7-311 and 7-312 through 7-3$m$1 and 7-3$m$2 only in power supply circuit 3-3. The switching elements may be configured in this case as power semiconductor switches, for example in the form of IGBTs (insulated gate bipolar transistors) or as MOSFETs (metal oxide semiconductor field-effect transistors).

Coupling units 6 make it possible to interrupt the respective power supply arm 3 by opening both switching elements 7 of a coupling unit 6. Alternatively, by closing a respective one of switching elements 7 of a coupling unit 6, energy storage cells 5 may either be bridged, for example by closing switch 7-311, or be connected into the respective power supply arm 3, for example by closing switch 7-312.

The total output voltages of power supply arms 3-1 through 3-3 are determined by the particular switching state of controllable switching elements 7 of coupling units 6 and may be set in stages. The staging is obtained in dependence on the voltage of the individual energy storage modules 4. Assuming the preferred embodiment of energy storage modules 4 configured in the same way, a maximum possible total output voltage is given by the voltage of an individual energy storage module 4 times the number m of energy storage modules 4 connected in series per power supply arm.

Coupling units 6 thus allow phases U, V, W of electric machine 1 to be switched either to a high reference potential or to a low reference potential and to that extent may also fulfill the function of a known inverter. Power and operating mode of electric machine 1 may therefore be controlled by controllable first energy store 2 with suitable actuation of coupling units 6. Controllable first energy store 2 therefore fulfills to that extent a dual function since on the one hand it serves to supply electrical energy to electric machine 1 but on the other hand it serves to control electric machine 1.

In the exemplary embodiment illustrated, electric machine 1 is configured as a three-phase rotary current machine, but may also have fewer or more than three phases. The number of phases of the electric machine also determines, of course, the number of power supply arms 3 in controllable first energy store 2.

In the exemplary embodiment illustrated, each energy storage module 4 has a plurality of series-connected energy storage cells 5. Alternatively, energy storage modules 4 may, however, also have only a single energy storage cell each or may also have energy storage cells connected in parallel.

In the exemplary embodiment illustrated, coupling units 6 are each formed by two controllable switching elements 7.

Coupling units 6 may, however, also be implemented by more or fewer controllable switching elements as long as it is possible to perform the necessary functions (interruption of the power supply arm, bridging of the energy storage cells and connection of the energy storage cells into the power supply arm). Examples of alternative configurations of a coupling unit are apparent from the German Applications DE 10 2010 027 857 and DE 10 2010 0278 861. In addition, it is also conceivable, however, for the coupling units to have switching elements in a full bridge connection, which offers the additional possibility of a voltage reversal at the output of the energy storage module.

During operation of electric machine 1 in motor mode, controllable first energy store 2 delivers at the output side an alternating voltage for actuating electric machine 1. In contrast to conventional systems, in which an electric machine is controlled via an inverter and is supplied with electrical energy by an electrical energy store that is separate therefrom, no DC voltage is available, however, for directly supplying power to electrical consumers, such as, for example, high-volt consumers in an onboard vehicle power supply system, or as an input quantity for a DC-DC converter.

For that reason, energy storage modules 4-1$m$, 4-2$m$ and 4-3$m$, which are connected to reference bus T- directly, that is, without the interposition of further energy storage modules 4, are configured in such a way that energy storage cells 5-1$m$, 5-2$m$ and 5-3$m$ of those energy storage modules 4-1$m$, 4-2$m$ and 4-3$m$, respectively, are connected on one side directly to reference bus T-. In practice, that is achieved by virtue of the fact that the corresponding switching elements 7 of the associated coupling units 6, for example switching element 7-3$m$2 of coupling unit 6-3$m$, is not disposed between energy storage cells 5 and reference bus T-, but is disposed in that connection line of energy storage cells 5 which is remote from the reference bus. The energy storage cells of an energy storage module, in the illustrated exemplary embodiment energy storage cells 5-3$m$ of energy storage module 4-3$m$, have on the other side, that is, on that side of energy storage cells 5-3$m$ which is remote from reference bus T-, a terminal connection A3 for a DC link 8. It is pointed out that for the invention to be applied, it is, of course, sufficient if those energy storage modules 4 that are connected to a DC link 8 are configured in the manner described.

As an alternative to the embodiment illustrated, terminal connection A3 may, however, also be disposed at an output of energy storage module 4-3$m$ including energy storage cells 5-3$m$ serving as energy stores, which output is remote from reference bus T-.

DC link 8 includes a link capacitor 9 which is connected on one side to reference bus T- and on the other side, via an inductance 10 which is intended to avoid current spikes, to terminal connection A3 of energy storage cells 5-3$m$. Energy storage cells 5-3$m$ thus serve as energy stores for DC link 8 from which electrical consumers 11 may be supplied with DC voltage.

Connected downstream of link capacitor 9 is a first DC-DC converter 12 which adapts a first voltage level of link capacitor 9 to a second voltage level of a further energy store 13 from which electrical consumers 14 may be supplied with DC voltage at the second voltage level. The further energy store may, for example, be in the form of a battery or a supercap. Depending on the actual voltage level, first DC-DC converter 12 may be formed with or without galvanic isolation. If the voltage level of DC link 8 is already sufficient to supply all the electrical consumers, DC-DC converter 12 may, of course, be dispensed with.

Figure 2:
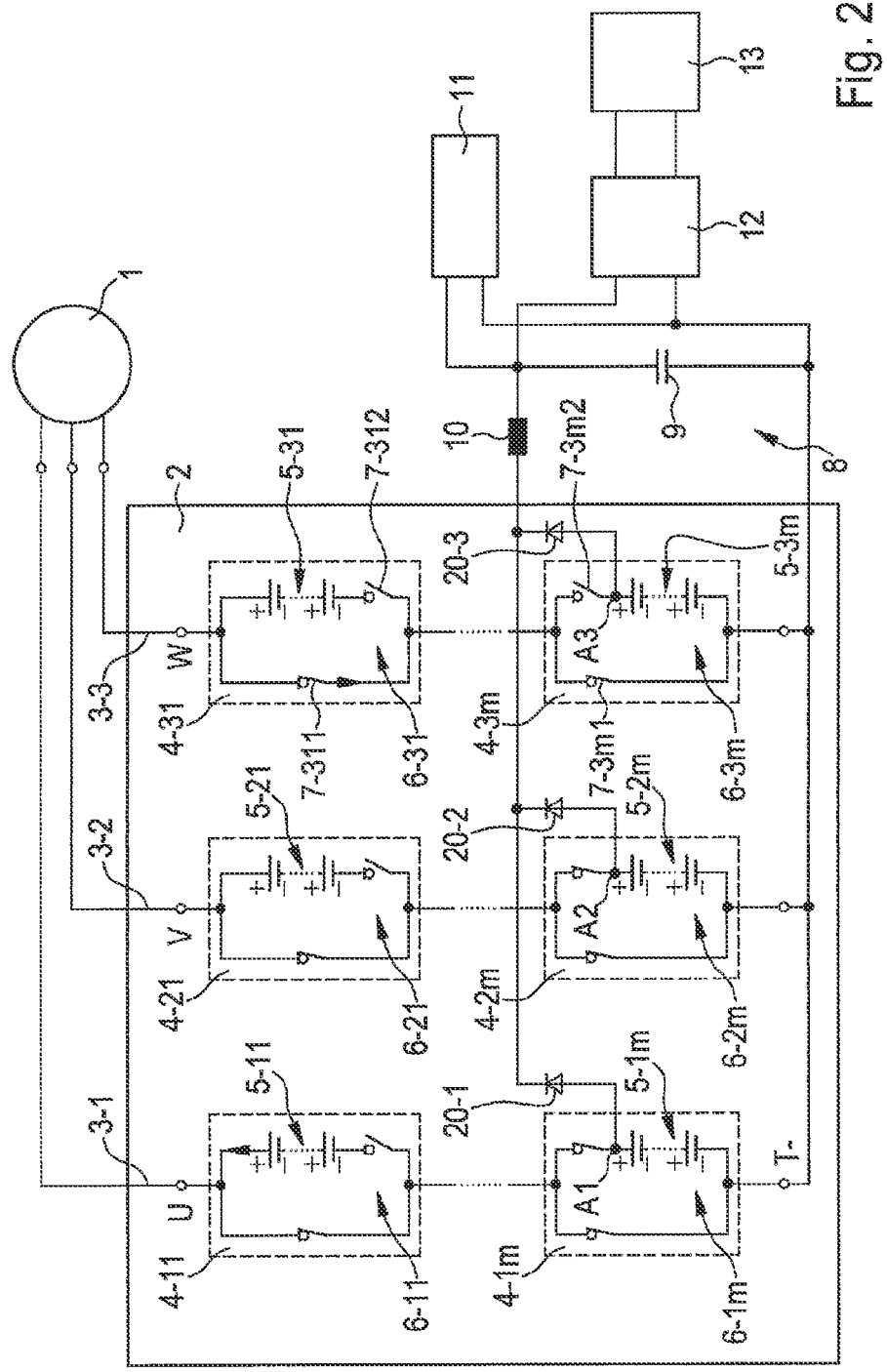
FIG. 2 is a schematic illustration of a second embodiment of a power supply system according to the invention.

FIG. 2 shows a second embodiment of a power supply system according to the invention. That embodiment differs from the first embodiment in that energy storage modules 5-1$m$, 5-2$m$ and 5-3$m$ of all power supply arms 3-1, 3-2 and 3-3, respectively, which modules are directly connected to reference bus T-, have a terminal connection A1, A2 and A3, respectively, via which the energy supply cells are connected in parallel connection to DC link 8. In that manner, the failure resistance and the total capacity of the energy store of the DC link 8 are increased. For mutual decoupling, diodes 20-1, 20-2 and 20-3 are connected in series with energy storage cells 5-1$m$, 5-2$m$ and 5-3$m$, respectively. In that manner, it is always energy storage module 4 whose energy storage cells 5 currently have the greatest charge that is automatically loaded. In that case also, terminal connections A1, A2 and A3 may, as an alternative to the embodiment shown, be disposed at that output of the respective energy storage modules 4-1$m$, 4-2$m$ and 4-3$m$ that is remote from reference bus T-.

Figure 3:
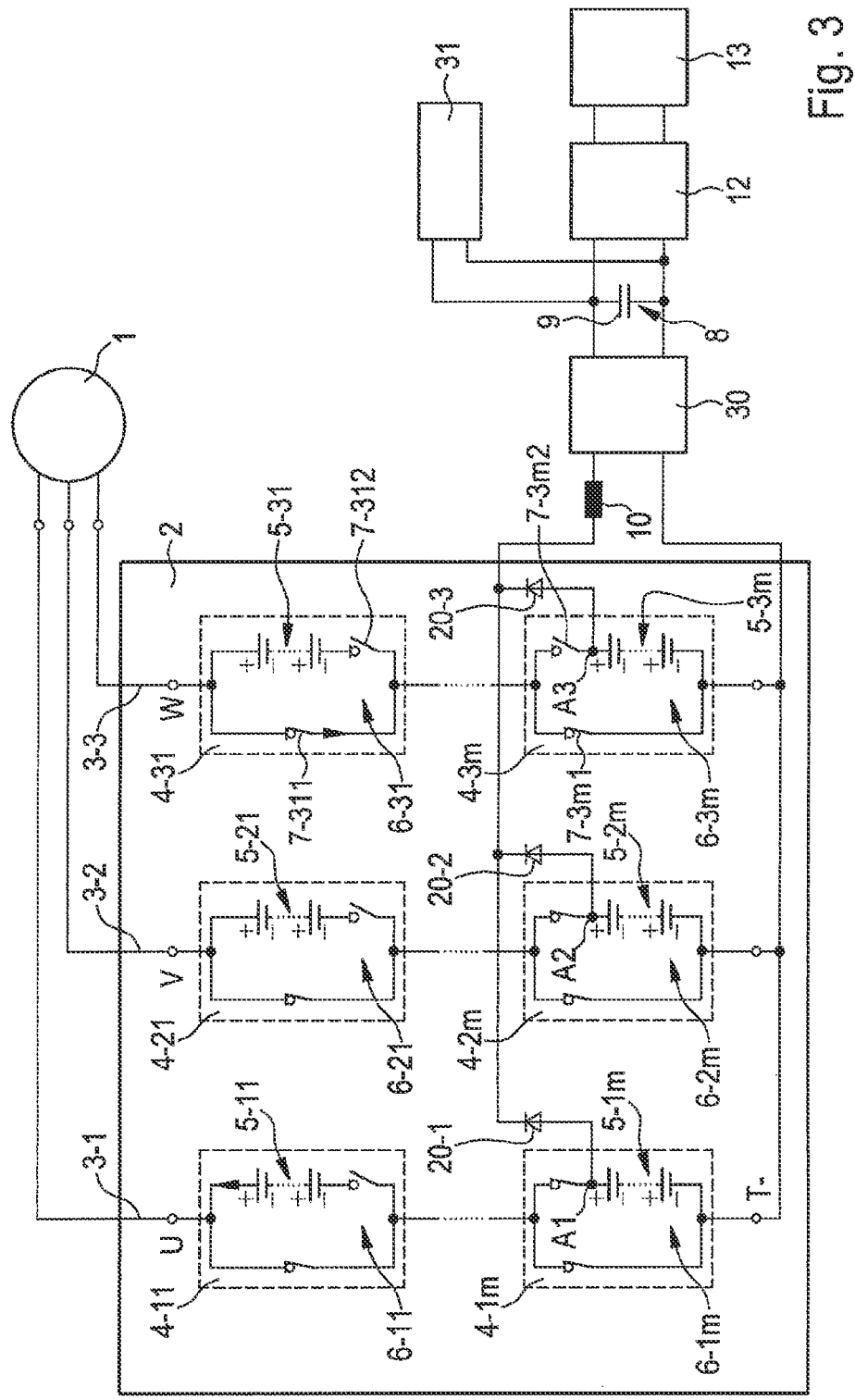
FIG. 3 is a schematic illustration of a third embodiment of a power supply system according to the invention.

If a voltage level above the total voltage of energy storage cells 5-1$m$, 5-2$m$, 5-3$m$ serving as energy stores for DC link 8 is required in DC link 8, then a second DC-DC converter 30 may be connected upstream of link capacitor 9 (cf. FIG. 3). That converter 30 is then able to adapt the total voltage of energy storage cells 5-1$m$, 5-2$m$, 5-3$m$ serving as energy stores for DC link 8 to a first voltage level of link capacitor 9, which, for example, may be in the high-volt range. High-volt consumers 31, for example, may then be supplied with power from the DC link. Depending on the actual voltage level, DC-DC converters 12 and 30 may be formed with or without galvanic isolation. It should be pointed out that, depending on the particular demand made on the power supply system, first DC-DC converter 12 may, of course, also be omitted.

The charging of energy storage cells 5-1$m$, 5-2$m$, 5-3$m$ serving as energy stores for DC link 8 may take place during operation of electric machine 1. For that purpose, energy storage cells 5-1$m$, 5-2$m$, 5-3$m$ are connected into the respective power supply arm 3-1, 3-2, 3-3 by appropriate actuation of associated coupling units 6-1$m$, 6-2$m$, 6-3$m$, respectively, during an operating phase in which current is being fed back into controllable energy store 2 from electric machine 1. The terminal voltage, which is thereby reduced for electric machine 1, may be compensated for by suitable adaptation of the associated space phasor.

What is claimed is:

1. A power supply system, comprising:
   a controllable energy store configured to control and supply electrical energy to an n-phase electric machine, where n>1;
   wherein the controllable energy store has n parallel power supply arms which: (i) each have at least two series-connected energy storage modules which each include at least one electrical energy storage cell with an associated controllable coupling unit; (ii) are connectable on a first side to a reference bus; and (iii) are connectable on a second side to one respective phase of the electric machine;
   wherein the coupling units one of bridge the respectively associated energy storage cells or connect the respectively associated energy storage cells into the respective power supply arm, dependent on control signals; and
   wherein, in at least one of the power supply arms, in the energy storage module directly connected to the reference bus, the energy storage cells of the energy storage module are directly connected to the reference bus and serve as energy stores for a DC link.

2. The power supply system as recited in claim 1, wherein in all of the power supply arms, in the energy storage modules directly connected to the reference bus, the energy storage cells of the energy storage modules are directly connected to the reference bus and serve as parallel-connected energy stores for the DC link.

3. The power supply system as recited in claim 2, wherein the energy storage cells serving as energy stores for the DC link are each connected to the DC link via at least one diode.

4. The power supply system as recited in claim 2, wherein the energy storage cells serving as energy stores for the DC link are connected to the DC link via at least one inductance.

5. The power supply system as recited in claim 2, wherein a total voltage of the energy storage cells serving as energy stores for the DC link is no greater than 60 Volts.

6. The power supply system as recited in claim 2, wherein the DC link has a link capacitor electrically connected on one side to the reference bus and on the other side to a terminal connection of the energy storage cells serving as energy stores, and wherein the terminal connection is remote from the reference bus.

7. The power supply system as recited in claim 2, wherein the DC link has a link capacitor electrically connected on one side to the reference bus and on the other side to a terminal connection at an output of the energy storage modules including the energy storage cells serving as energy stores, and wherein the output is remote from the reference bus.

8. The power supply system as recited in claim 6, wherein, downstream of the link capacitor, a first DC-DC converter is connected which adapts a first voltage level of the link capacitor to a second voltage level of a further energy store.

9. The power supply system as recited in claim 8, wherein, upstream of the link capacitor, a second DC-DC converter is connected which adapts a total voltage of the energy storage cells serving as energy stores for the DC link to the first voltage level of the link capacitor.

10. A method for charging at least one energy storage cell serving as an energy store for a DC link in a power supply system including a controllable energy store configured to control and supply electrical energy to an n-phase electric machine, where n≥1, wherein the controllable energy store has n parallel power supply arms which: (i) each have at least two series-connected energy storage modules which each include at least one electrical energy storage cell with an associated controllable coupling unit; (ii) are connectable on a first side to a reference bus; and (iii) are connectable on a second side to one respective phase of the electric machine, wherein the coupling units one of bridge the respectively associated energy storage cells or connect the respectively associated energy storage cells into the respective power supply arm, dependent on control signals, and wherein, in at least one of the power supply arms, in the energy storage module directly connected to the reference bus, the energy storage cells of the energy storage module are directly connected to the reference bus and serve as energy stores for a DC link, the method comprising:

controlling all of the coupling units associated with the energy storage cells serving as energy stores for the DC link, in an operating phase of the electric machine in which current is flowing out of the electric machine into the controllable energy store, in such a way that the associated energy storage cells are connected into the respective power supply arm.

* * * * *